United States Patent [19]
Vandendriessche

[11] Patent Number: 5,536,145
[45] Date of Patent: Jul. 16, 1996

[54] METHOD OF MANUFACTURING A TURBINE WHEEL HAVING INSERTED BLADES, AND A WHEEL OBTAINED BY PERFORMING THE METHOD

[75] Inventor: Georges Vandendriessche, Vernon, France

[73] Assignee: Societe Europeenne De Propulsion, Suresnes, France

[21] Appl. No.: 244,850

[22] PCT Filed: Oct. 27, 1993

[86] PCT No.: PCT/FR93/01048

§ 371 Date: Jun. 16, 1994

§ 102(e) Date: Jun. 16, 1994

[87] PCT Pub. No.: WO94/10426

PCT Pub. Date: May 11, 1994

[30] Foreign Application Priority Data

Oct. 27, 1992 [FR] France ................... 92 12791

[51] Int. Cl.$^6$ ........................................ F01D 5/28
[52] U.S. Cl. ................ 416/213 R; 416/218; 416/220 R; 416/229 A; 416/234; 416/241 R; 416/241 B; 29/464; 29/530; 29/559; 29/889.21; 29/889.71
[58] Field of Search ............................ 416/213 R, 218, 416/220 R, 229 R, 229 A, 230, 234, 241 R, 241 B; 29/889.21, 889.22, 889.71, 464, 530, 559

[56] References Cited

U.S. PATENT DOCUMENTS

| | | | |
|---|---|---|---|
| 994,681 | 6/1911 | Hodgkinson | 416/218 |
| 2,771,267 | 11/1955 | Weymouth, Jr. . | |
| 3,940,268 | 2/1976 | Catlin | 416/241 R |
| 4,097,276 | 6/1978 | Six | 416/241 B |
| 4,270,256 | 6/1981 | Ewing | 29/889.21 |
| 4,326,835 | 4/1982 | Wertz | 416/241 B |
| 4,445,259 | 5/1984 | Ekbom | 29/889.21 |
| 4,464,097 | 8/1984 | Schultz | 416/230 |
| 4,492,522 | 1/1985 | Rossmann et al. | 416/241 B |
| 4,662,824 | 5/1987 | Ortolano | 416/218 |
| 4,790,723 | 12/1988 | Wilson et al. | 416/241 B |
| 5,113,583 | 5/1992 | Jenkel et al. | 29/889.21 |

FOREIGN PATENT DOCUMENTS

| | | | |
|---|---|---|---|
| 0073651 | 3/1983 | European Pat. Off. . | |
| 1602316 | 11/1970 | France . | |
| 0630732 | 10/1949 | United Kingdom | 416/218 |
| 2161109 | 1/1986 | United Kingdom . | |

Primary Examiner—Edward K. Look
Assistant Examiner—Christopher Verdier
Attorney, Agent, or Firm—Weingarten, Schurgin, Gagnebin & Hayes

[57] ABSTRACT

To manufacture a turbine wheel having blades made of a ceramic or composite material and inserted into a metal hub, firstly blades (16) are manufactured that are right cylindrical, each blade having a base (18) through which a hole is formed; a cylindrical ring (20) is formed, the ring being provided with orifices through which the bases (18) of the respective blades (16) are inserted; the blade bases (18) are successively threaded onto an open annular rigid metal wire (30); the resulting assembly (16, 20, 30) is disposed inside a sealed housing (161); hot isostatic compaction is performed so as to compact a metal alloy in powder form (41) inside the sealed housing (161) so as to make the hub of the turbine wheel (100) while embedding the blade bases (18) and the metal wire (30) by using the powder metallurgy technique; and the outside portion of the sealed housing (161) delimiting the hub of the turbine wheel (101) is machined. Application, in particular, to the field of aeronautical or space engineering.

21 Claims, 7 Drawing Sheets

METHOD OF MANUFACTURING A TURBINE WHEEL HAVING INSERTED BLADES, AND A WHEEL OBTAINED BY PERFORMING THE METHOD

FIELD OF THE INVENTION

The present invention relates to a method of manufacturing a hybrid turbine wheel having blades made of a ceramic or composite material and fixed on a metal hub, and also to an inserted-blade turbine wheel obtained by performing the method. The invention is applicable both to the field of industry, and to the field of aeronautical and space engineering.

PRIOR ART

Documents EP-A-0 176 386, FR-A-2 637 319, and FR-A-2 476 766 disclose examples of one-piece turbine wheels in which both the hubs and the blades are made entirely of composite materials. Such turbine wheels offer the advantage of being lightweight, but they are difficult to manufacture because the unidirectional strength characteristics of the composite fibers must be adapted to the multidirectional stress field that exists in an assembly constituted by a disk and by blades, and balancing problems also exist.

In that type of turbine wheel, it is also necessary to take into account the shear and deformation characteristics of the matrix and of the fibers, and there is also a danger that the blades might shear off at the rim.

Also, Documents FR-A-2 608 674, EP-A-0 367 958 and U.S. Pat. No. 4,326,835 disclose examples of compound turbines having blades made of a ceramic or composite material, each of the blades having a base enabling it to be inserted into a metal hub.

In that type of turbine, the blades are manufactured in the form of discrete components, and they are then received and locked in the periphery of a metal disk by assembly means, e.g. dovetail means.

Such a blade has a complicated shape because its base is dovetail or Christmas tree shaped. Therefore, it is difficult to machine the composite material, and also to assemble the blades with the hub.

Turbine rotors that are made entirely of metal are also known. But they have considerable mass, and, as a result of the way in which they are assembled, their speeds of rotation are limited.

OBJECT AND BRIEF DESCRIPTION OF THE INVENTION

An object of the present invention is to remedy the above-mentioned drawbacks of known turbine wheels, and in particular to enable turbine wheels to be manufactured simply that have improved mechanical strength and that are capable of withstanding high speeds of rotation under difficult environmental conditions.

To these ends, the invention provides a method of manufacturing a turbine wheel having blades made of a ceramic or composite material and inserted into a metal hub, said method being characterized in that it comprises the following steps:

a) the blades are manufactured from a ceramic or composite material, each blade having an essentially right cylindrical shape with a cross-section defining a predetermined non-circular shape, and a hole is formed in the base of each blade, the hole being essentially perpendicular to the axis of the blade;

b) a closed cylindrical ring is formed of predetermined height that corresponds to the width of the hub of the wheel, the ring being provided with orifices corresponding to the predetermined cross-sectional shape of the blades;

c) the bases of the blades are inserted through said orifices in the rim-forming cylindrical ring;

d) the bases of the various blades inserted through the cylindrical ring are successively threaded onto an open annular rigid metal wire which has a smaller diameter than the cylindrical ring and which passes through said holes formed in the bases of the blades;

e) the assembly constituted by the blades, by the cylindrical ring and by the annular rigid metal wire is disposed inside a sealed housing after removable spacers or inserts have been interposed between the heads of the blades projecting radially outwards beyond said cylindrical ring;

f) hot isostatic compaction is performed so as to compact a metal alloy in powder form that is inserted into the sealed housing so as to make the hub of the turbine wheel while embedding the blade bases and the annular rigid metal wire by using the powder metallurgy technique; and g) the outside portion of the sealed housing delimiting the hub of the turbine wheel is machined and said removable spacers are removed.

By retaining the blades by means of the rigid metal wire passing through their bases, it is possible to hold the blades effectively both while they are being installed, and during the final assembling step in which the blade bases and the rigid metal wire are embedded in the hub made of a metal alloy by hot isostatic compaction.

The method of the invention enables blades to be manufactured "by the yard". According to a particular characteristic of the present invention, a long cylindrical length of ceramic or composite material is manufactured in a single operation, said length having a cross-section of predetermined uniform shape, and then said long length of ceramic or composite material is cut up into individual blades.

By using a "sausage-making" technique, manufacturing the blades is greatly simplified compared with blades made of a composite material and having complex shapes, with bases that are dovetail or Christmas tree shaped.

The method of the invention increases the mechanical strength of the wheel, which is a compound wheel, in which the blades made of a composite material offer good resistance to creep, to oxidation, and to vibrations, in a high-temperature environment, and the metal hub offers good fatigue strength in a medium-temperature environment.

The method of the invention imparts good adhesion between the composite blades and the compacted metal. It enables the wheel to withstand high speeds of rotation of about 1,000 revolutions per second, and high temperatures.

Advantageously, the rim-forming closed cylindrical ring is made of metal, but it may also be made of a ceramic or composite material.

The orifices, which correspond to the predetermined cross-sectional shape of the blades, may be cut in a preformed cylindrical ring.

However, to form a closed cylindrical ring, orifices that correspond to said predetermined cross-sectional shape of the blades may be initially cut in a flat metal strip of predetermined width corresponding to the width of the hub of the wheel, and the metal strip provided with the orifices is then shaped into a closed cylindrical ring.

In a particular implementation, after making the assembly constituted by the blades, by the metal or composite cylindrical ring, and by the annular rigid metal wire, the blade bases are soldered to the metal or composite cylindrical ring, and the sealed housing is connected to the metal or composite cylindrical ring, with only the blade bases and the rigid metal wire being disposed inside the sealed housing in which the hot isostatic compaction operation is performed.

In which case, each of the blade bases (and the cylindrical ring if it is made of a composite) is advantageously covered with a layer of sealant and/or with a diffusion barrier layer before the soldering operation is performed.

In another particular implementation, the hot isostatic compaction is performed in a sealed housing which surrounds the entire assembly constituted by the blades, by the cylindrical ring, by the rigid metal wire, and by the spacers or inserts.

This implementation is particularly simple because it does not involve any soldering around the blades, and poses no sealing problem. Metal or ceramic spacer-forming inserts must merely be held between the blades outside the cylindrical ring so as to prevent the blades from being crushed, since the pressure is taken up by the inserts.

Advantageously, the hot isostatic compaction is performed at a temperature of about 1,000° C. and under a pressure of about 1,000 bars. These conditions depend on the material used for manufacturing the hub.

Regardless of the implementation, the metal alloy in powder form used for the hot isostatic compaction is advantageously of the same type as the material forming the rigid metal wire. This makes the hub very homogeneous. However, different materials may also be chosen depending on the applications for which the turbine wheel is to be used.

To enable the blade bases to be threaded onto the annular rigid metal wire, the opening therein is slightly wider than the depth of a hole formed in a blade base.

In the final position, one of the ends of the annular rigid metal wire may be situated substantially half-way into the hole formed in a blade base. In a variant implementation, in the final position, the two ends of the annular rigid metal wire are situated between two blades and said two ends are clipped together.

Advantageously, a specific protective layer is deposited on each blade head over the portion that projects from the cylindrical ring, so as to provide the projecting portion of the blade head with protection against oxidation and attack from aggressive media.

The invention also provides a one-piece turbine wheel of heterogeneous composition, the turbine wheel having blades made of a ceramic or composite material and inserted into a metal hub, the turbine wheel being applicable, in particular, to the field of aeronautical or space engineering, said turbine wheel being characterized in that each of the blades has an essentially right cylindrical shape with a cross-section defining a predetermined non-circular shape, and includes a blade base embedded in the metal hub and provided with a hole that extends essentially perpendicular to the axis of the blade, a metal member embedded in the hub passing through the holes in the various blade bases.

BRIEF DESCRIPTION OF THE DRAWINGS

Other characteristics and advantages of the invention will appear from the following description of particular implementations given by way of non-limiting example and with reference to the accompanying drawings, in which.

DETAILED DESCRIPTION OF PARTICULAR IMPLEMENTATIONS OF THE INVENTION

The method of the invention facilitates making a one-piece turbine wheel of heterogeneous composition, essentially comprising blades 16 made of a composite material having a composite matrix, the blades being inserted into a metal hub 40 made by powder metallurgy.

For example, the blades made of a composite material may be made of carbon-carbon or of carbon-silicon carbide.

Each of the blade heads 17 constituted by the portions of the blades that project from the hub 40 may be covered with a specific protective layer 171 for providing protection against oxidation and attack from aggressive media (e.g. such as hydrogen or rocket propellant components). The protective layer 171 may also play a part in sealing the composite material.

Each of the blade bases 18 embedded in the hub 40 may also be pre-covered with a layer of sealant, or with a diffusion barrier layer 180.

The hub 40 may be made from an alloy, e.g. based on nickel, titanium, or iron. However, it is easy to adapt the manufacturing method to a wide variety of types of alloy.

Such protective layers 171, diffusion barrier layers 171, or sealing layers on the blades 16 may have thicknesses lying in the range a few hundreds of a millimeter to a few millimeters, and they may be made by using various techniques, e.g. such as plasma deposition, electrolytic deposition, chemical vapor deposition or physical vapor deposition, and deposition by painting.

The sealing or diffusion-barrier layers 180 deposited on the blade bases 18 may also contribute to improving the interface between the metal of the hub and the composite material of the blade, and, in particular, they may have intermediate chemical compositions taking into account the differences in expansion behavior of the two materials constituting the blades 16 and the hub 40. By way of example, a sealing or diffusion-barrier layer 180 may comprise an alloy based on copper and nickel.

In accordance with a major characteristic of the present invention, the blades 16 are essentially right-cylindrical with cross-sections that are of predetermined non-circular shapes.

Figure 1:
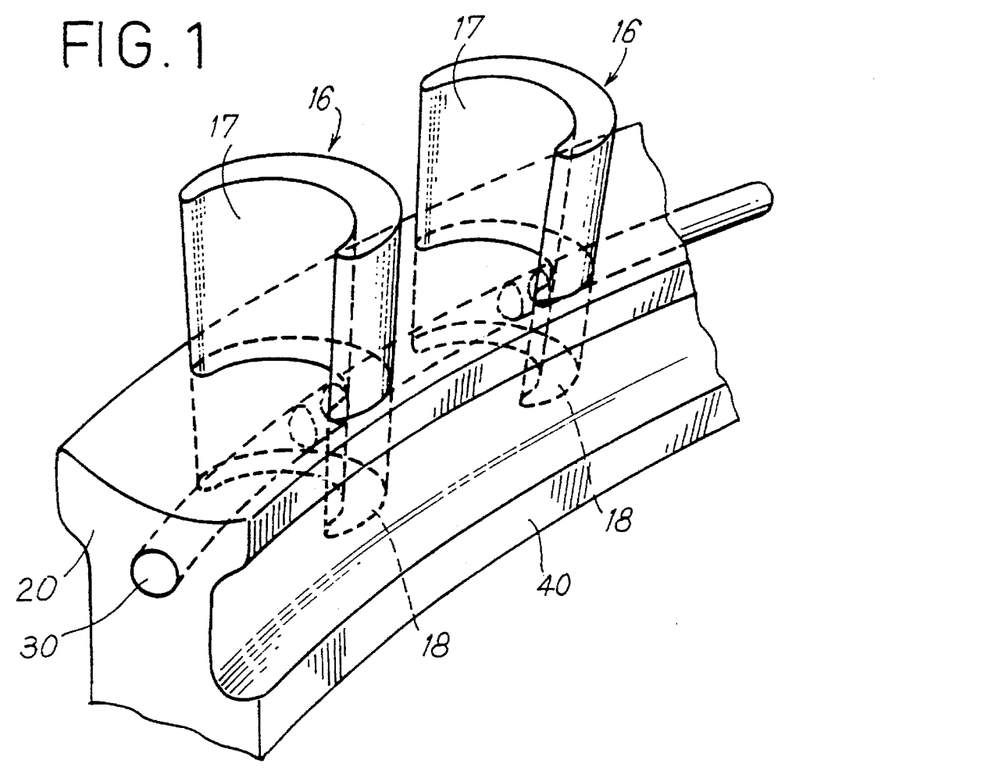
FIG. 1 is a perspective view of a portion of an example of a turbine wheel of the invention.
Figure 2:
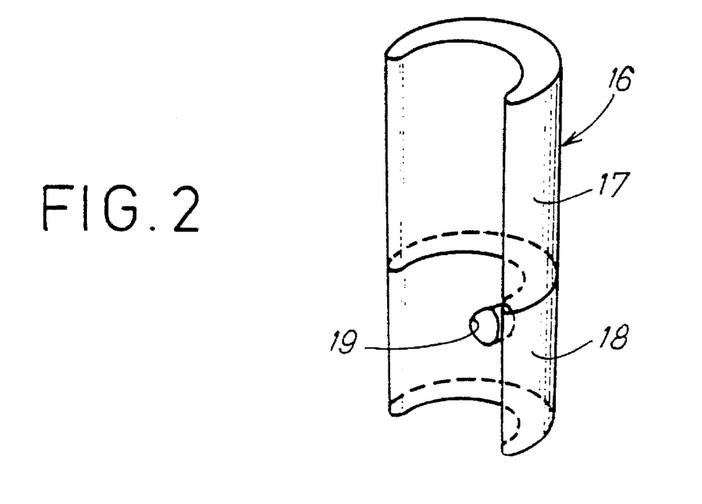
FIG. 2 is a perspective view of an example of a blade that is made of a composite material and that may be incorporated into a turbine wheel of the invention.

FIGS. 1 and 2 show blades 16 having crescent-shaped cross-sections. In FIGS. 8, 9, 12, and 13, the blades 16 have rectangular cross-sections, so that they are in the shape of very simple rectangular blocks.

Various other cross-sectional shapes are possible, as a function of the applications for which the turbine wheel is to be used.

Although the blades may be shaped individually, it is also possible, given their cylindrical shape, to make large numbers of them simultaneously from a single cylindrical bar which has the desired shape, and which is then merely cut up into lengths, each of which corresponds to a respective blade. This "sausage-making" technique is made possible by the fact that the blade bases do not need to be dovetail or Christmas tree shaped as they do in existing turbine wheels, and the shape of the blade may be obtained by merely stacking up fibers.

In accordance with the invention, it is merely necessary to provide a hole 19 in each blade base 18, the hole extending perpendicular to the longitudinal direction of the blade 16, so as to make it possible to insert a rigid metal wire 30 (FIG. 1) which enables the various blades 16 to be installed and to be retained while the hub 40 is being formed, as explained below. This type of installation technique avoids having complicated shapes for the blade bases 18, while also increasing the mechanical strength of the assembly.

In addition to manufacturing the blades 16, a metal or composite flat ring 20 is manufactured to delimit the rim of the turbine wheel from which the blades 16 inserted in the hub 40 are to project.

Figure 3:
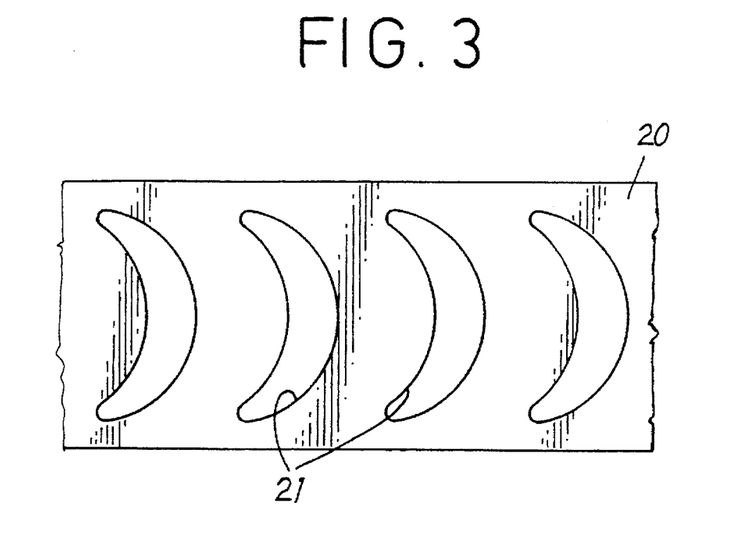
FIG. 3 is a view of a portion of flat metal strip provided with openings through which blades can pass.

To this end, a flat metal strip 20 may be used in which a series of regularly spaced-apart openings 21 are cut, each opening having the same cross-sectional shape as the blades 16 (FIG. 3). The openings may be cut by using various methods, e.g. such as punching, electro-erosion, laser cutting or water-jet cutting, or conventional machining.

Figure 4:
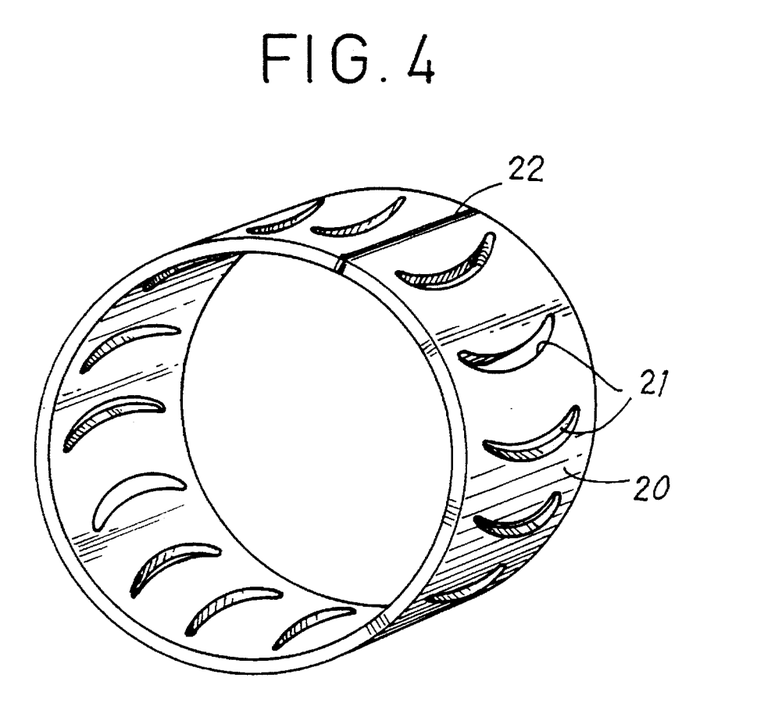
FIG. 4 is a perspective view of a flat metal strip provided with openings, showing the strip after it has been shaped into a closed cylindrical ring.

Lengths of flat metal strip provided with openings 21 are then shaped into rings 20 and the two ends of each length of strip shaped into a ring are secured together in a region 22 (FIG. 4), e.g. by welding.

In a variant implementation, lengths of flat metal strip are initially cut and shaped into closed rings 20, and openings 21 are then cut in the closed cylindrical rings 20.

Each cylindrical ring 20 may also be made of a composite material, with a series of regularly spaced-apart openings 21 being provided in the ring, e.g. by means of any one of the above-mentioned methods.

Figure 5:
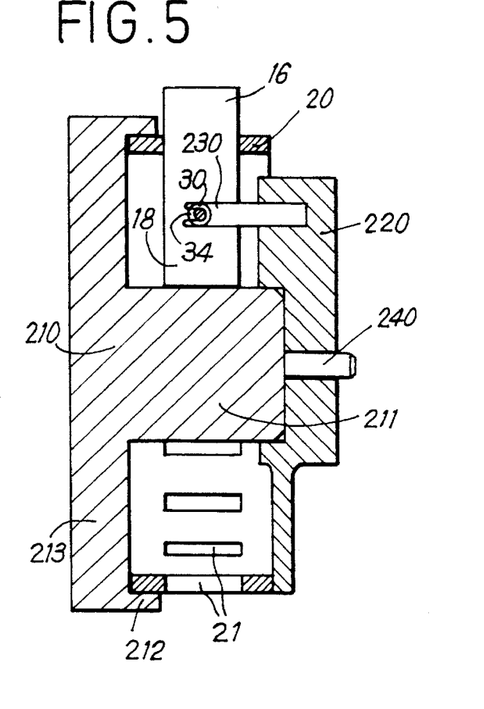
FIG. 5 is an axial section view showing how a blade is installed through an opening in the ring shown in FIG. 4, and how a rigid wire is engaged for retaining the base of the blade.

After the blades 16 and a closed cylindrical ring 20 provided with openings 21 have been made, the ring 20 is disposed in an installation member 210 (FIG. 5), e.g. comprising a cylindrical central core 211 and a cylindrical outer ring 212 that is coaxial with the core 211 and that is connected thereto via a disk-shaped external cheek 213. The closed cylindrical ring 20 is inserted inside the outer cylindrical ring 212 which holds it in position. The blades 16 are successively inserted through the holes 21 in the closed cylindrical ring 20 and they are positioned against the central core 211 which serves as a centering abutment for the blade bases 18.

As each new blade 16 is inserted into the rim-forming cylindrical ring 20, an open annular rigid metal wire 30 which is preferably circular in cross-section is inserted through the hole 19 in the blade 16.

Figure 6:
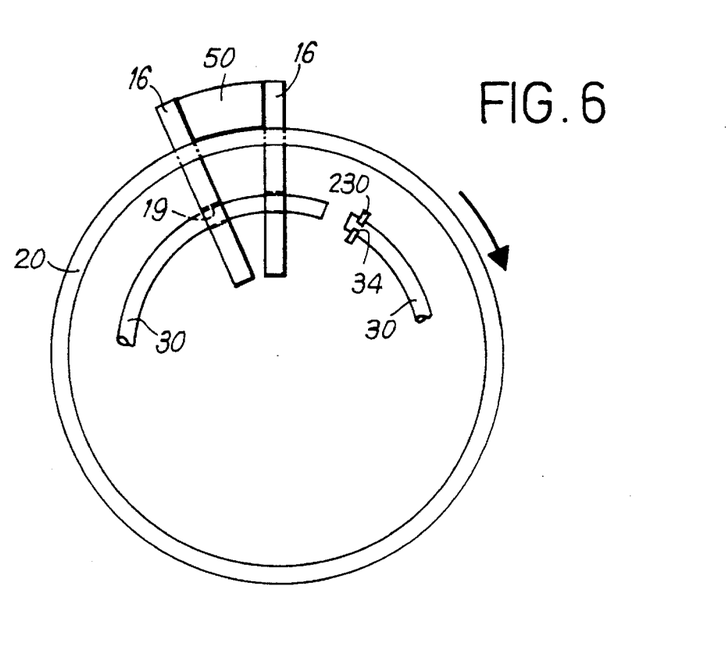
FIG. 6 is a plan view showing how the blades are engaged into the FIG. 4 ring, and how the blade bases are threaded onto an open annular rigid wire.

In this way, the bases 18 of the blades 16 are threaded successively onto the annular metal wire 30 which has a smaller diameter than the cylindrical ring 20, and which is to be embedded in the hub 40 of the turbine wheel. The gap in the metal wire 30, which is toroidal or of square cross-section, is slightly wider than the thickness of a blade base 18, so that it is possible to engage a blade base 18 between the two free ends 31 and 32 of the rigid wire 30 (FIG. 6).

The wire 30 may be passed through the holes 19 in the blade bases 18 by means of a mechanism 220 placed on the other side of the wire from the installation support 210, the mechanism being centered by means of a pin 240 on the central core 211, and including a clamp 230 that can be engaged in a groove 34 formed in the vicinity of a first free end 31 of the metal wire 30.

Figure 7A:
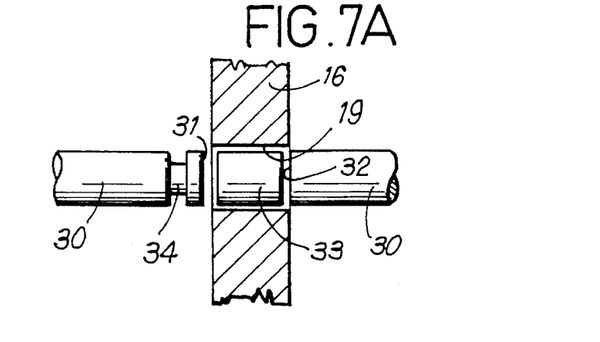
FIGS. 7A and 7B show a possible example of the last two steps of threading blade bases onto an open annular rigid wire.
Figure 7B:
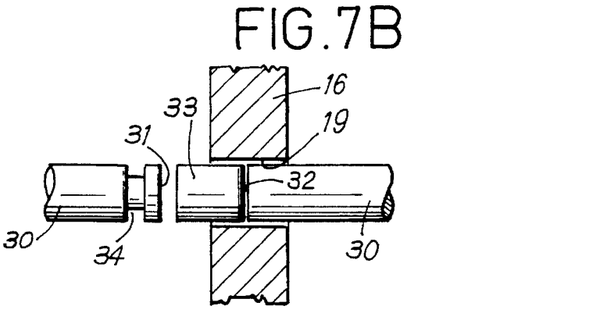

FIGS. 7A and 7B show an example of how the wire 30 may be threaded through the hole 19 in the last blade 16 to be installed, at the end of the threading process. A cylindrical insert 33 having the same diameter as the wire 30 is inserted into the hole 19 in the blade 16, and the blade 16 is positioned such that the hole 19 is situated between the free ends 31 and 32 of the wire 30 (FIG. 7A). By rotating the wire 30, one free end 32 is inserted halfway into the hole 19, so that it pushes the insert 33 into an offset position, thereby retaining the blade 16 (FIG. 7B).

In a variant implementation, at the end of the process of threading the blades 16 onto the wire 30, both of the free ends 31 and 32 of the wire 30 are situated between two blades 16, and they are clipped together.

Figure 8:
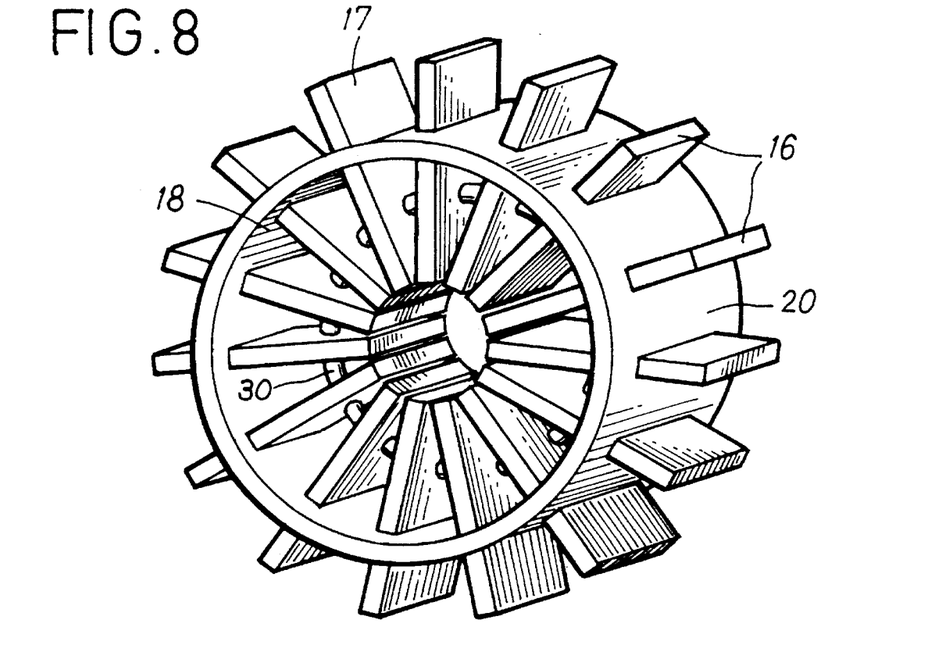
FIG. 8 is a perspective view of an assembly of the invention comprising blades made of a composite material, inserted into a cylindrical ring, and having bases that are threaded onto a metal retaining wire.

FIG. 8 shows an example of the assembly as obtained at the end of the step during which the blades 16 are inserted through the cylindrical outer ring 20, and the blade bases 18 are threaded onto the annular rigid wire 30. The FIG. 8 example shows fifteen rectangular-block shaped radial blades 16 regularly spaced apart over the cylindrical outer ring 20 delimiting the rim of the turbine wheel. The inner metal wire 30 retains the blade bases 18 that are to be embedded in the metal hub. Naturally, the number of blades 16 may differ from fifteen as a function of the applications and of the dimensions of the turbine wheel.

The assembly shown in FIG. 8 constitutes the framework of the turbine wheel, and said assembly must then be inserted into a sealed housing so as to enable a metal hub to be made by powder metallurgy.

There are several different possible ways of making the hub.

Figure 10:
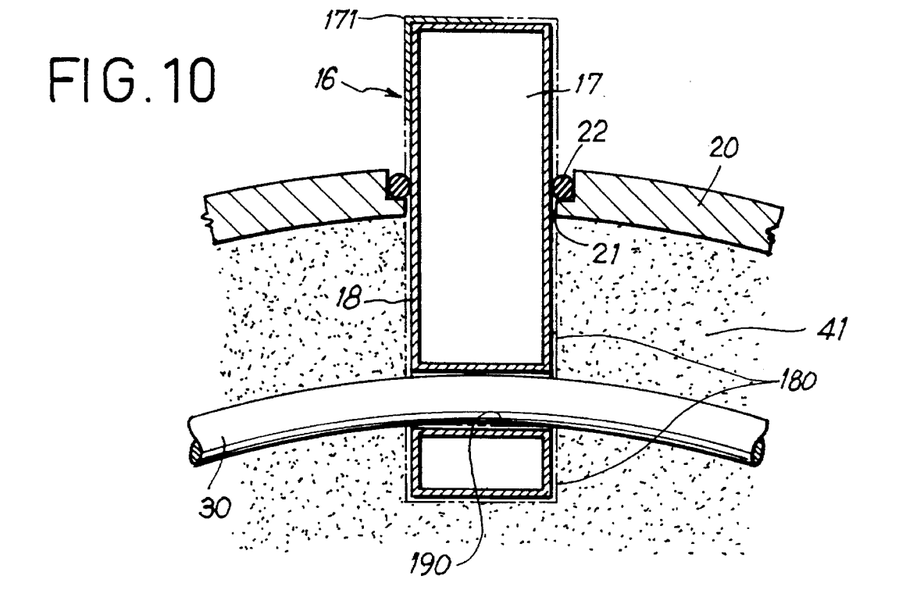
FIG. 10 is a detail view in radial section showing how a blade is soldered to a cylindrical ring.
Figure 12:
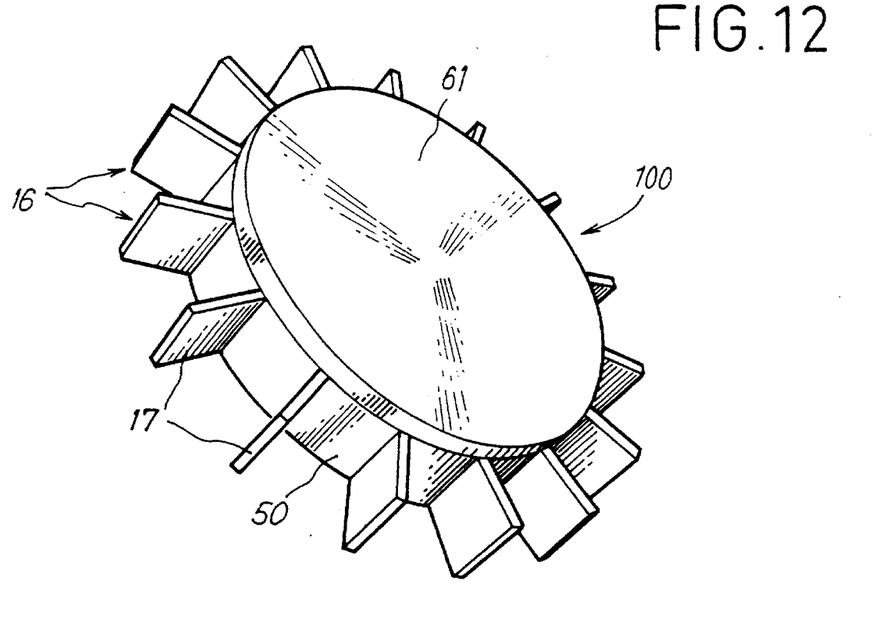
FIGS. 12 and 13 are perspective views showing two opposite faces of a turbine wheel of the invention provided with a metal housing for the purposes of making the hub by hot isostatic compaction, with the end portions of the blades projecting from the housing.
Figure 13:
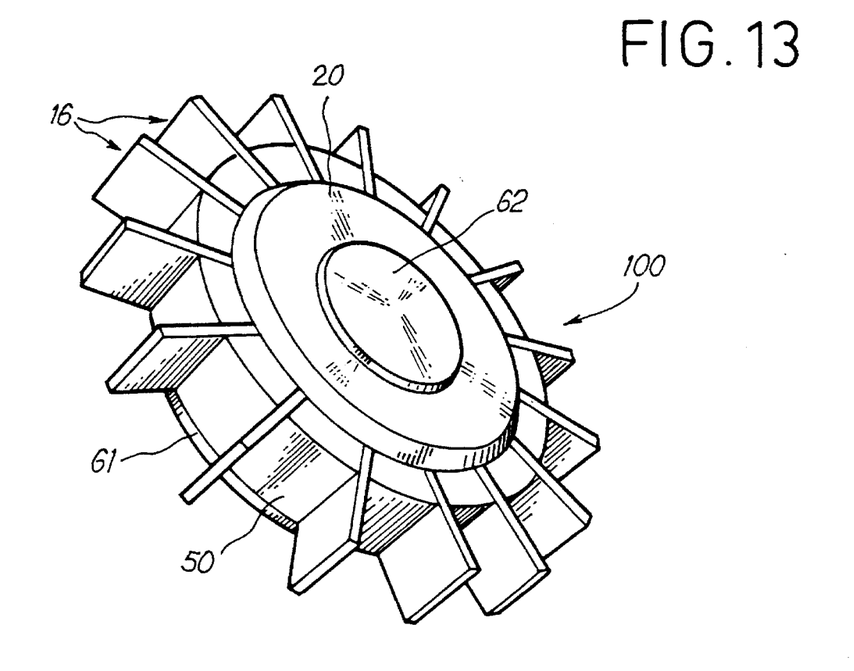

In a first possible implementation shown in FIGS. 10, 12, and 13, the blades 16 are soldered to the outer ring 20 at the openings 21 by means of a solder wire 22, so as to provide sealing between the blades 16 and the ring 20. The blade bases 18 are themselves pre-sealed, or else they receive a layer 180 acting as a diffusion barrier, before they are installed, as indicated above. Each of the holes 19 that receive the metal wire 30 is also provided with a sealing layer 190 or a bushing before the blades are installed.

Once the blades 16 have been soldered to the composite or metal cylindrical outer ring 20, said ring may constitute the side wall of the housing serving to make the hub by powder metallurgy. In which case, the only elements of the housing that need to be added to the assembly shown in FIG. 8 to constitute a sealed enclosure are the metal front end face 62 (FIG. 13) and the metal rear end face 61 (FIG. 12) which close off the central hub portion delimited by the outer ring 20. As shown in FIGS. 12 and 13, metal or composite spacer-forming inserts 50 may be disposed temporarily between the heads 18 of the blades 16 so as to limit the stresses to which the blades 16 may be submitted during the hot isostatic compaction operation. In which case, one of the portions of the housing, such as the rear face 61, may extend radially beyond the outer ring 20 so as to hold the inserts 50 which nevertheless remain outside the housing in this implementation.

After a metal alloy in powder form 41 has been inserted into the sealed housing, hot isostatic compaction is performed, e.g. at 1,000° C. and under about 1,000 bars.

The inserts 50 are then removed, and the housing 61, 62 is machined so as to give the hub of the turbine wheel 100 its final shape. The blades 16 then require only minor final adjustments while the turbine wheel is being balanced.

Another possible way of manufacturing the hub by powder metallurgy is described below with reference to FIGS. 9, 11, 11A, 14, and 15.

In this particular implementation, it is not necessary to provide a sealed bond between the outer ring 20 and each of the blades 16. However, an insert 50, e.g. made of metal or ceramic, must be disposed in each of the gaps between the blades 16, the inserts 50 extending substantially over the entire height of the blade heads 17 projecting from the outer ring 20 (FIG. 9) so as to prevent the blades from being crushed under the action of the high pressures used. The inserts 50 may be coated, e.g. with boron nitride so as to prevent them from adhering to the blades 16 made of a composite material, or to the outer ring 20, and so that they can be removed more easily after the hot isostatic compaction operation.

Figure 9:
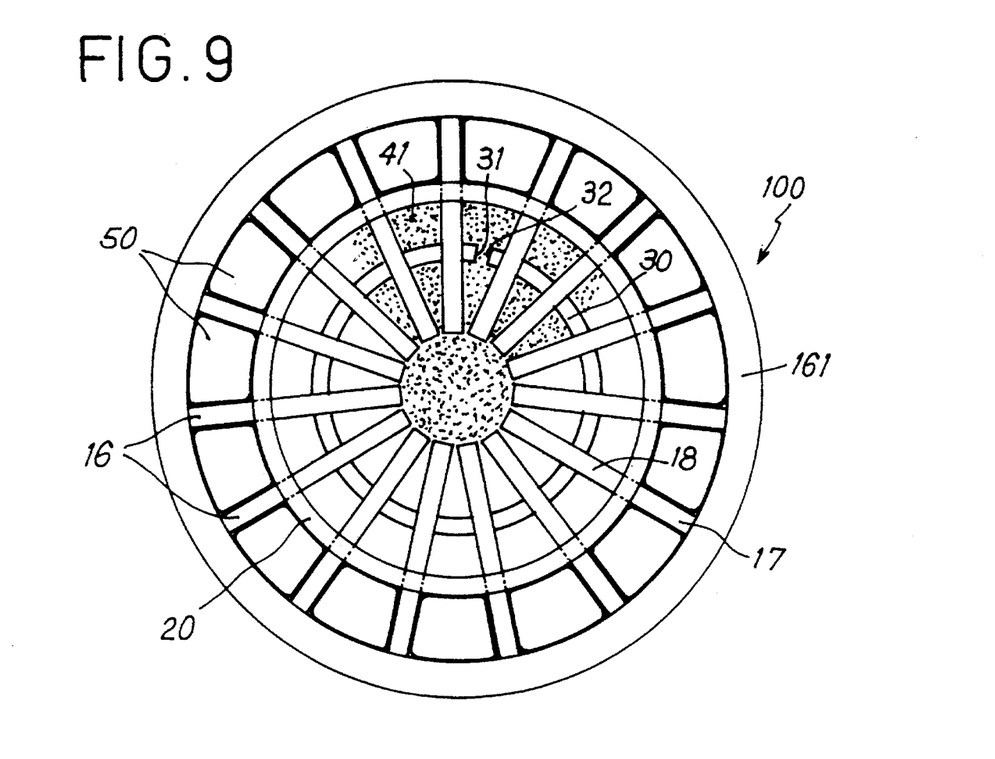
FIG. 9 is a radial section view of the assembly shown in FIG. 8 placed in a housing so that a hot isostatic compaction can be performed.

In this implementation, the entire assembly as shown in FIG. 8, to which the inserts 50 have been added, as shown in FIG. 9, is incorporated in a sealed housing 161, 162. No particular sealing needs to be provided at the individual blades 16, and this simplifies the implementation. The housing 161, 162 may be formed by a back 161 (FIG. 14) and by a cover 162 (FIG. 15).

Figure 14:
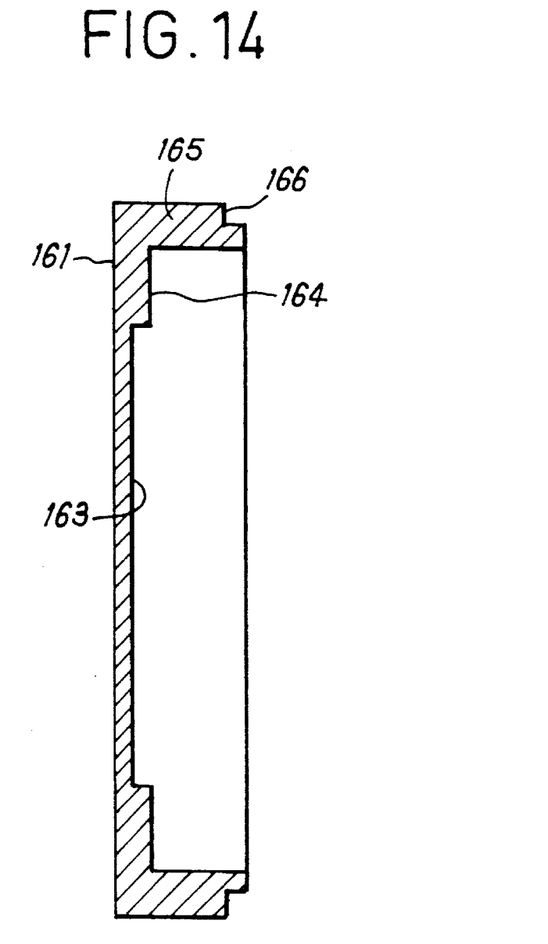
FIGS. 14 and 15 are axial section views showing two portions of a housing for containing an assembly of the invention such as the assembly shown in FIG. 8, the housing enabling a hub to be made by hot isostatic compaction, with the entire blades being enclosed in the housing.

The central portions 163 and 167 of the back 161 and of the cover 162 define the end faces of the housing, and said central portions delimit a volume corresponding to the hub proper, i.e. to the space inside the outer ring 20. The peripheral portions 165 and 168 of the back 161 and of the cover 162 delimit a narrower space which corresponds to the width of each of the heads 18 of the blades 16.

Figure 11:
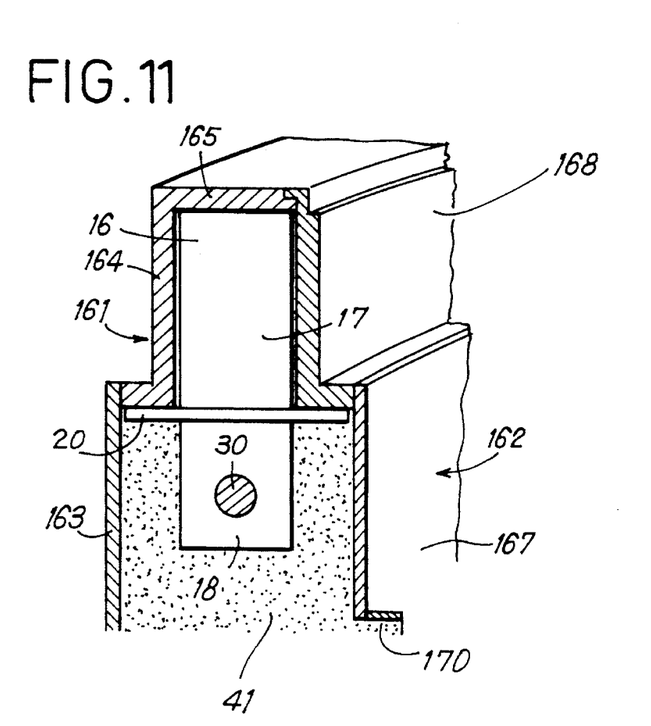
FIG. 11 is a detail perspective view in axial half-section showing a blade enclosed in a housing for the purposes of making the hub by hot isostatic compaction.
Figure 11A:
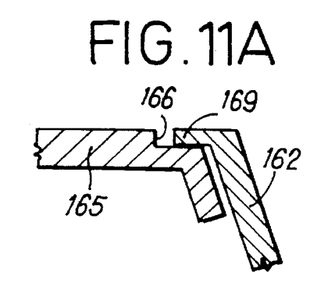
FIG. 11A is a detail view showing an example of how the two portions of the housing shown in FIG. 11 may be coupled together.
Figure 15:
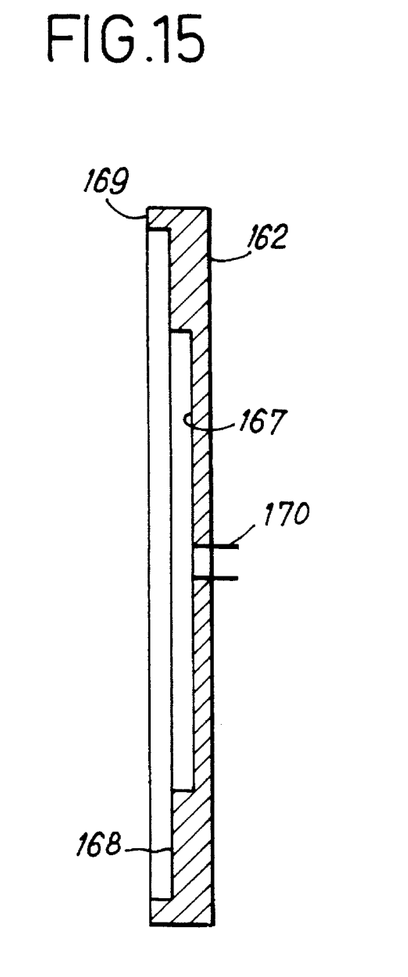

In FIGS. 11 and 15, reference 170 designates the channel via which the metal alloy in powder form 41 is inserted into the housing.

The two portions 161 and 162 of the housing are connected together in sealed manner by welding, e.g. at a peripheral groove 166 formed in the back 161 and in which a lip 169 on the cover 162 (FIG. 11A) is engaged.

After the metal alloy in powder form 41 has undergone hot densification inside the housing 161, 162 so as to form the metal hub, the housing 161, 162 is removed by machining, the inserts 50 are removed from the empty spaces between the blade heads 18, and final machining is performed on the turbine wheel so as to balance it.

The toroidal metal wire 30 is embedded in the metal hub at the end of the hot isostatic compaction operation, and it contributes not only to holding the blades in position during the hot isostatic compaction stage, but also to imparting greater tear-off strength to the blades so that they can withstand greater centrifugal forces. The metal wire 30 is advantageously made of the same material as the hot isostatic compaction material, so as to make the hub more homogeneous, but this is not absolutely necessary.

The method of the invention enables a one-piece turbine wheel or compressor wheel 100 of heterogeneous composition to be made simply, in which the blades 16 made of a ceramic or composite material and inserted into the metal hub 40 may have very simple shapes and may be more effectively secured to the metal hub 40. In the finished product, each of the bodies of the blades 16 constituted by blade heads 17 projecting from the hub 40, and by blade bases 18 embedded in the metal hub, has an essentially right cylindrical shape with a cross-section of predetermined non-circular shape. Once embedded in the hub 40, the metal wire 30 continues to pass through the holes 19 formed in the blade bases 18, each hole extending essentially perpendicular to the axis of the respective blade 16.

I claim:

1. A method of manufacturing a turbine wheel having blades made of a ceramic or composite material and inserted into a metal hub, said method being characterized in that it comprises the following steps:

the blades are manufactured from a ceramic or composite material, each blade having an essentially right cylindrical shape defining an axis with a cross-section defining a predetermined non-circular shape, and a hole is formed in the base of each blade, the hole being essentially perpendicular to the axis of the blade;

a closed rim forming cylindrical ring is formed of predetermined height that corresponds to a width of the hub of the turbine wheel, the ring being provided with orifices corresponding to the predetermined cross-sectional shape of the blades;

the bases of the blades are inserted through said orifices in the rim-forming cylindrical ring;

the bases of the various blades inserted through the cylindrical ring are successively threaded onto an open annular rigid metal wire which has a smaller diameter than the cylindrical ring and which passes through said holes formed in the bases of the blades;

removable spacers or inserts are interposed between heads of the blades projecting radially outwards beyond said cylindrical ring;

an assembly constituted by at least the bases of the blades, by the cylindrical ring and by the annular rigid metal wire is disposed inside a sealed housing have been interposed between heads of the blades projecting radially outwards beyond said cylindrical ring;

hot isostatic compaction is performed so as to compact a metal alloy in powder form that is inserted into the sealed housing so as to make the hub of the turbine wheel while embedding the blade bases and the annular rigid metal wire by using powder metallurgy technique; and an outside portion of the sealed housing delimiting the hub of the turbine wheel is machined and said removable spacers are removed.

2. A method according to claim 1, characterized in that a long cylindrical length of ceramic or composite material is manufactured in a single operation, said length having a cross-section of predetermined uniform shape, and then said long length of ceramic or composite material is cut up into individual blades.

3. A method according to claim 1, characterized in that said cylindrical ring is formed of metal.

4. A method according to claim 1, characterized in that said cylindrical ring is formed of a composite material.

5. A method according to claim 1, characterized in that said orifices, which correspond to the predetermined cross-sectional shape of the blades, are cut in a pre-formed cylindrical ring.

6. A method according to claim 3, characterized in that, to form the closed cylindrical ring, orifices that correspond to said predetermined cross-sectional shape of the blades are initially cut in a flat metal strip of predetermined width corresponding to the width of the hub of the wheel, and the metal strip provided with the orifices is then shaped into said closed cylindrical ring.

7. A method according to claim 1, characterized in that, after making the assembly constituted by the blades, by the cylindrical ring, and by the annular rigid metal wire, the blade bases are soldered to the cylindrical ring, and the sealed housing is connected to the cylindrical ring, with only the blade bases and the rigid metal wire being disposed inside the sealed housing in which the hot isostatic compaction operation is performed.

8. A method according to claim 7, characterized in that each of the blade bases is covered with a layer of sealant or with a diffusion barrier layer before the soldering operation is performed.

9. A method according to claim 1, characterized in that the hot isostatic compaction is performed in the sealed housing which surrounds the entire assembly constituted by the blades, by the cylindrical ring, by the rigid metal wire and by the spacers.

10. A method according to claim 1, characterized in that the hot isostatic compaction is performed at a temperature of about 1,000° C. and under a pressure of about 1,000 bars.

11. A method according to claim 1, characterized in that the blades are made of composite materials of the carbon-carbon type or of the carbon-silicon carbide type.

12. A method according to claim 1, characterized in that the metal alloy in powder form used for the hot isostatic compaction is of the same type as the material of the annular rigid metal wire.

13. A method according to claim 1, characterized in that the opening in the annular rigid metal wire is slightly wider than the depth of a hole formed in the blade base.

14. A method according to claim 13, characterized in that, in the final position, one of the ends of the annular rigid metal wire is situated substantially half-way into the hole formed in the blade base.

15. A method according to claim 13, characterized in that, in the final position, the two ends of the annular rigid metal wire are situated between two blades.

16. A method according to claim 1, characterized in that the metal alloy in powder form compacted during the hot isostatic compaction is based on nickel, titanium or iron.

17. A method according to claim 1, characterized in that the sealed housing is formed of a back-forming first metal part and of a cover-forming second metal part, the two parts being welded together, and in that the hot isostatic compaction is performed via one of said first and second metal parts.

18. A method according to claim 1, characterized in that a specific protective layer is deposited on each blade head over the portion that projects from the cylindrical ring, so as to provide the projecting portion of the blade head with protection against oxidation and attack from aggressive media.

19. A one-piece turbine wheel of heterogeneous composition, the turbine wheel having blades made of a ceramic or composite material and inserted into a metal hub, said turbine wheel being characterized in that each of the blades has an essentially right cylindrical shape with a cross-section defining a predetermined non-circular shape, and includes a blade base embedded in the metal hub and provided with a hole that extends essentially perpendicular to the axis of the blade, a metal member embedded in the hub passing through the holes in the various the blade bases, the blade bases, the metal member, and the metal hub being integrally formed by hot isostatic compaction.

20. A turbine wheel according to claim 19, as used in the field of aeronautical or space engineering.

21. The method according to claim 1, including manufacturing a long ceramic or composite material in a single operation, said length having a cross-section of predetermined uniform shape, and then cutting up said long length of ceramic or composite material into individual blades; wherein said cylindrical ring is formed of a metal or of a composite material;

said orifices, which correspond to the predetermined cross-sectional shape of the blades, are cut in said pre-formed cylindrical ring;

the hot isostatic compaction is performed in the sealed housing which surrounds the entire assembly constituted by the blades, by the cylindrical ring, by the rigid metal wire and by the spacers;

the hot isostatic compaction is performed at a temperature of about 1,000° C. and under a pressure of about 1,000 bars;

the blades are made of composite materials of the carbon-carbon type or of the carbon-silicon carbide type;

the metal alloy in powder form used for the hot isostatic compaction is of the same type as the material of the annular rigid metal wire;

the opening in the annular rigid annular wire is slightly wider than the depth of the hole formed in a blade base;

in the final position, one of the ends of the annular rigid metal wire is situated substantially half-way into the hole formed in a blade base and the two ends of the annular rigid metal wire are situated between two blades;

the metal alloy in powder form compacted during the hot isostatic compaction is based on nickel, titanium or iron;

the sealed housing is formed of a back-forming first metal part and of a cover-forming second metal part, the two parts being welded together, and the hot isostatic compaction is performed via one of said first and second metal parts; and a specific protective layer is deposited on each blade head over the portion that projects from the cylindrical ring, so as to provide the projecting portion of the blade head with protection against oxidation and attack from aggressive media.

* * * * *